Patented Feb. 4, 1936

2,029,799

UNITED STATES PATENT OFFICE 2,029,799

PROCESS FOR PRODUCING TETRAZOLES OF THE CAMPHOR GROUP AND PRODUCTS THEREFROM

Karl Friedrich Schmidt, Ludwigshafen-on-the-Rhine, Germany, assignor to E. Bilhuber, Inc., Jersey City, N. J., a corporation of New Jersey No Drawing. Application July 17, 1934, Serial No. 735,631. In Germany July 22, 1933

7 Claims. (Cl. 260—44)

This invention relates to a process for the production of therapeutically active tetrazole derivatives of the terpene series and to the resulting products.

It is known that by treating carbonyl compounds with hydrazoic acid (Stickstoffwasserstoffsäure) in the presence of catalysts, one generally obtains tetrazoles.

On the other hand, the same tetrazoles can be obtained from the corresponding carbonyl compounds, by converting the latter with hydroxylamine into oximes. The latter, by conversion with ester-forming substances, such as aromatic sulfonic acid, are converted into the oxime ester, and thereupon in the presenec of hydrazoic acid or of azides undergo the Beckmann rearrangement.

It has now been found that starting with camphor or thujone or their isomers, one obtains, in accordance with this process, tetrazoles comprising the formula $C_{10}H_{16}N_4$. These new substances can be advantageously used therapeutically. They contain simultaneously the atomic grouping of the camphor or thujone, and that of the pentamethylene tetrazole. They have an analeptic effect which is greater and more lasting than the known pentamethylene tetrazole. The action of both—especially that of tetrazole obtained from camphor—differs from that of camphor by the absence of paralyzing properties and by the considerably greater solubility in water. Starting with synthetic camphor one obtains an optically inactive product. On the other hand the products produced from optically active forms turn the plane of polarized light; for instance, the tetrazole produced from natural dextro-rotary camphor turns the plane of polarized light to the left.

Differences in the action of the optically active and racemic compounds cannot be noted, as is also the case with camphor. The same applies to the products which merely differ by thier melting point and which are produced from the thujone available in the trade or from pure β-thujone.

The following are examples of methods which I now prefer to employ in carrying out the invention. It is to be understood that the invention is not restricted thereto.

Example 1

To a solution of 30.4 grams (0.2 mol) camphor in 250 cubic centimeters benzol, chloroform or the like containing 0.5 mol hydrazoic acid (Stickstoffwasserstoffsäure), there are added, drop by drop, 100 grams of antimony pentachloride, while stirring, at the temperature of 35–40° C. After completed conversion, alkali solution is added, and the reaction product is shaken out with benzol. The residue remaining after distilling off of the benzol is treated with steam, whereby there are removed some unchanged camphor and any campholenic acid nitril which may have been produced. thereupon acidulate with diluted hydrochloric acid and the tetrazole precipitating is taken up with ether. The yield is 75% of the theoretical yield. The refining of the raw product can be effected by recrystallizing of the mercuric chloride double compound (melting point 208°) from water or by recrystallizing of the tetrazole from benzol, ether, propyl alcohol or dilute hydrochloric acid. The melting point of the pure product is at 242–43° C. The racemic compound and the optically active form do not show any difference in the melting point.

Example 2

Into a mixture of 250 cubic centimeters 2.2 mol hydrazoic acid and benzol with 55 grams of tin tetrachloride and 15 cubic centimeters of concentrated sulfuric acid, 30.4 grams of Japan camphor dissolved in benzol are added drop by drop at 35–40° C. The process is carried out as in the case of Example 1. There are obtained about 15 grams of camphor tetrazole, of a melting point of 242–243° C. The produce is levo-rotary.

Example 3

To a solution of 30.4 grams camphor in 250 cubic centimeters benzol-hydrazoic acid there are added, drop by drop, 80 cubic centimeters of concentrated (or 100% sulfuric acid) while stirring. After working and removing of the by-products one obtains a yield of 20% of the theoretical yield of camphor tetrazole having a melting point of about 242–243° C.

Example 4

16.7 grams of thujone oxime (obtained by the action of molar quantities of hydroxylamine on thujone)—the common thujone of the trade (mixture of α- and β-thujone) are dissolved in 50 cubic centimeters of chloroform and 3 mol pyridine, and treated, while cooling well, with 1 mol benzene sulfonic acid chloride. Into the solution of the ester produced 1 mol of powdered sodium azide or 1 mol of hydrazoic acid in chloroform is introduced. Finally the temperature is increased to 50° C. After the adding of dilute sulfuric acid the reaction product is shaken out with benzol. The tetrazole remains after the distilling off of the solvent and is recrystallized from ether and petroleum ether. It melts at 86° C. and is easily soluble in most organic solvents. The aqueous solution, upon adding of mercuric chloride, results in a crystalline precipitate of the mercuric chloride double compound.

If one starts with pure β-thujone, one obtains a product which has a melting point of 93–95° C. In a similar manner the tetrazole is obtained from camphor oxime.

*Example 5*

To a benzol solution containing 2.2 mol hydrazoic acid, 100 grams tin tetrachloride and about 10 grams of concentrated sulfuric acid solution of 32 grams thujone in benzol is added while stirring. The yield in thujone tetrazole is more than 7% of the theoretical yield. The thujone employed may be the commercial thujone or the pure, resulting in products having respectively the approximate melting points indicated in Example 4.

The expression "camphor-group" as employed in the claims is a term which is restricted to ordinary camphor, thujone, and stereo isomers of camphor and thujone including dextr-rotary camphor, levo-rotary and racemic camphor and likewise in connection with thujone, alpha-beta- and commercial thujone.

Having thus described my invention with particularity with reference to the preferred methods of carrying out the same, it will be obvious to those skilled in the art, after understanding my invention, that various changes and modifications may be made therein without departing from the spirit and scope of my invention, and I aim in the appended claims to cover such changes and modifications as are within the scope of the invention.

What is claimed as new and desired to be secured by Letters Patent is:

1. As a new product, a camphor-group tetrazole having the appearance of a colorless crystalline powder easily soluble in most organic solvents, soluble in water and of strong analeptic action.

2. As a new product, a camphor-group tetrazole containing the atomic grouping of camphor with a tetrazole nitrogen substituted in the ring being a colorless crystalline powder of a melting point of about 242–243° C. easily soluble in most organic solvents, soluble in water to the extent of about 2 per cent. and of strong analeptic effect.

3. As a new product, a camphor-group tetrazole containing the atomic grouping of thujone with a tetrazole nitrogen substituted in the ring being a colorless crystalline powder having a melting point of 86–95° C. easily soluble in most organic solvents, soluble in water to the extent of about 1 per cent. and of strong analeptic action.

4. A process for the production of therapeutically active tetrazoles which comprises reacting a camphor-group member with hydrazoic acid and recovering a camphor-group tetrazole.

5. A process for the production of therapeutically active tetrazoles which comprises reacting a camphor-group member with hydrazoic acid in the presence of a catalyst adapted to split the hydrazoic acid and introduce nitrogen into the ring, and recovering a camphor-group tetrazole.

6. A process for the production of therapeutically active tetrazoles which comprises treating camphor with at least two molecules of hydrazoic acid in the presence of a catalyst adapted to split the hydrazoic acid and introduce nitrogen into the ring, and recovering camphor tetrazole of a melting point of about 242–243° C.

7. A process for the production of therapeutically active tetrazoles which comprises treating thujone with at least two molecules of hydrazoic acid in the presence of a catalyst adapted to split the hydrazoic acid and introduce nitrogen into the ring, and recovering thujone tetrazole of a melting point of about 86° C.

KARL FRIEDRICH SCHMIDT.